United States Patent [19]

Smith et al.

[11] 3,951,604

[45] Apr. 20, 1976

[54] CONTROLLED POLYMERIZATION APPARATUS

[75] Inventors: Dexter E. Smith; William S. Stewart, both of Bartlesville, Okla.

[73] Assignee: Phillips Petroleum Company, Bartlesville, Okla.

[22] Filed: Apr. 8, 1974

[21] Appl. No.: 458,698

Related U.S. Application Data

[62] Division of Ser. No. 192,290, Oct. 26, 1971, Pat. No. 3,817,962.

[52] U.S. Cl. .............................. 23/253 A; 23/288 E; 235/151.12
[51] Int. Cl.² ...................... B01J 8/08; G01N 31/08; G01N 33/00; G05B 21/02
[58] Field of Search .......... 23/253 A, 230 A, 288 E, 23/253 R, 253 US; 235/151.12, 151.12 MI; 260/80.78, 88.2 R, 94.9 P

[56] References Cited
UNITED STATES PATENTS

| | | | |
|---|---|---|---|
| 3,257,363 | 6/1966 | Miller et al. | 260/88.2 R |
| 3,523,929 | 8/1970 | Paige et al. | 260/80.78 |
| 3,565,873 | 2/1971 | Sutherland, Jr. et al. | 260/80.78 |
| 3,594,559 | 7/1971 | Pemberton | 235/151.12 MI |
| 3,835,106 | 9/1974 | Klaassen et al. | 260/94.9 P |

Primary Examiner—Joseph Scovronek

[57] ABSTRACT

In a poymerization system having first and second feed streams, diluent and recycled diluent streams, and a modifier stream controllably fed to a reactor, a resultant product stream is passed from the reactor, and a gas stream is removed from the resultant bottoms product of the reactor. The gas stream is analyzed and signals are delivered in response to the analysis. The signals are modified and compared to a modified signal responsive to one of the flow rates of the recycled diluent stream or the second feed stream that has been modified by the flow rate of the diluent stream for providing a resultant control signal for relatively controlling the flow of the modifier stream.

13 Claims, 1 Drawing Figure

U.S. Patent April 20, 1976 3,951,604
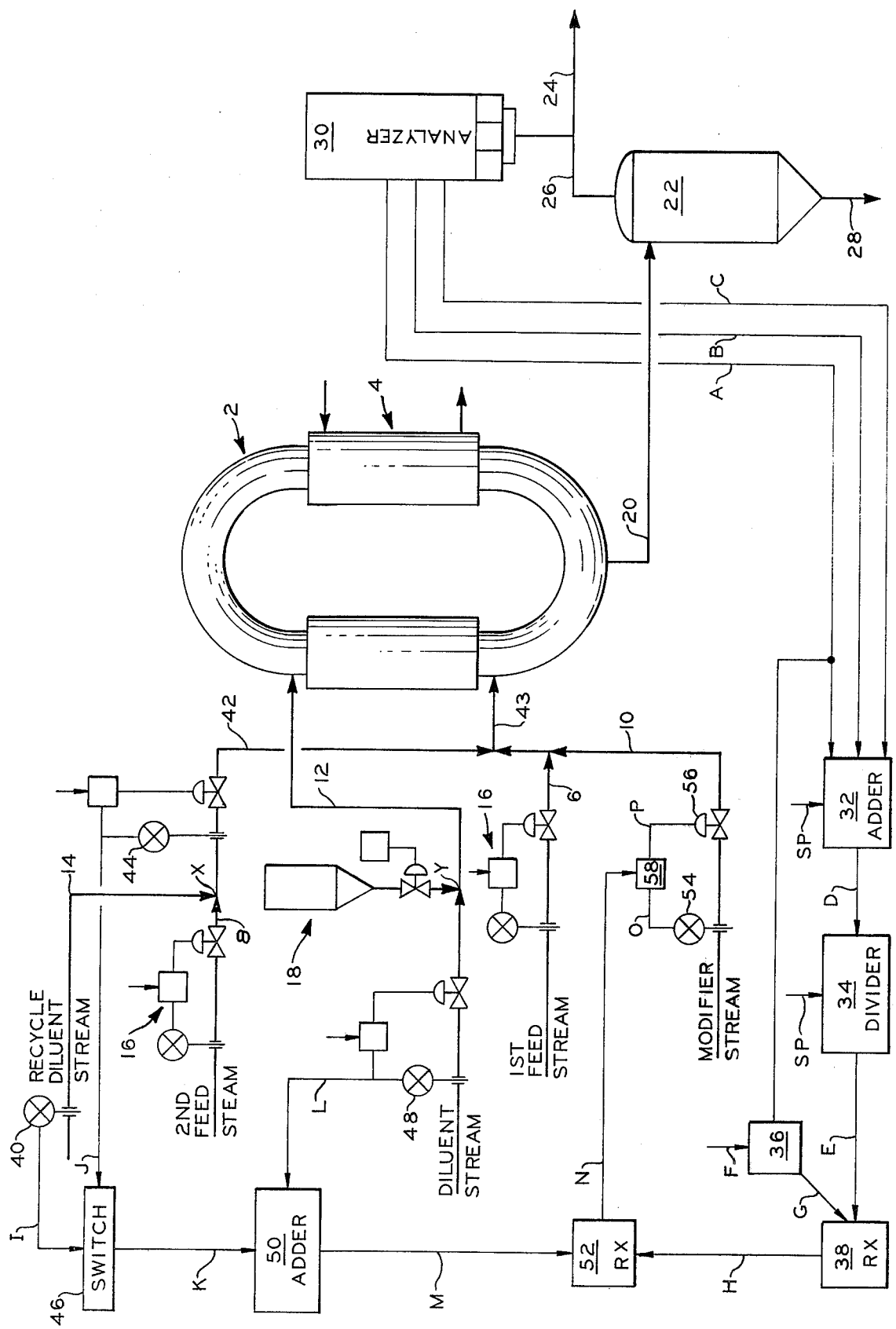

CONTROLLED POLYMERIZATION APPARATUS

This application is a division of copending application, Ser. No. 192,290, filed Oct. 26, 1971, now U.S. Pat. No. 3,817,962, issued June 18, 1974.

In a polymerization reaction system, it is often desirable to reduce the time lag between variations of one or more of the reactor feed streams and changes in the composition of the resultant product and to maintain a more uniform resultant product. The composition changes of the resultant product can often be minimized by controlling the rate of flow of the modifier stream in response to product analysis and flow rates of streams entering the reactor, thereby decreasing the disturbances in the reactor caused by varying flow rates. This is particularly true where the concentration of a monomer can vary significantly more rapidly than the concentration of the modifier stream.

In summary, this invention resides in improved control of the flow rate of one of the stream flowing into a reactor of the polymerization process system in response to analysis of a gas stream separated from the resultant product of the reactor and the flow rates of other stream flowing into the reactor.

The drawing is a diagrammatic view of an example polymerization system controlled by the process and apparatus of this invention.

Referring now to the drawing, a reactor 2 has a heat exchanging means 4 associated therewith to control the reaction temperature therein as known in the art. First and second feed streams 6, 8, for example an ethylene stream and a comonomer stream, are controllably passed via respective conduits into the reactor 2. A modifier stream 10 such as hydrogen, for example, a diluent stream 12 and a recycled diluent stream 14 such as isobutane, for example, are passed through the separate conduits into the reactor 2. Examples of the second feed stream 8 comonomer are hexene-1, or butene-1.

The first and second feed streams are controllably passed into the reactor at preselected rates. The controlling apparatus 16 such as a flow recorder controller can be associated with a computer or other means as known in the art for maintaining these flow rates at values relative to operating conditions of the system. Injection means 18, as known in the art, are associated with the system for controllably adding catalyst to the reactor 2 by, for example, injecting said catalyst into the diluent stream 12 at a location Y upstream of the reactor 2.

A discharge conduit 20 is connected at one end to the reactor and at the other end to a flash tank 22 for removing resultant product from the reactor and passing said product into the flash tank at which location an effluent gas stream 24 is separated therefrom. A line 26 is connected to an upper portion of the flash tank 22 for the passage of the effluent gas stream 24 from the flash tank 22 and line 28 is connected to a lower portion of the flash tank 22 for removing degasified product therefrom.

An analyzing-transmitting means 30 is associated with the gas stream for analyzing said stream. The analyzer can be for example a chromatographic analyzer having a plurality of chromatographic analyzing columns. The analyzing-transmitting means receives a portion of the gas stream 24, analyzes portions of the stream, and delivers a signal A responsive to the weight fraction of the modifier 20 in said effluent gas stream 24, a signal B responsive to the weight fraction of the first feed stream in said gas stream 24, and a signal C responsive to the weight fraction of the second feed stream in said gas stream 24.

A first adder 32 having a set point or bias of 1.00 is connected to the analyzer 30. It should be understood that the adder 32 can be a subtracting element and the use of the term is dependent upon whether one is considering negative or positive values. The first adder receives signals A, B, and C from the analyzer, subtracts signals A, B, and C from the set point 1.00 for example, and delivers a signal D responsive to said computation (D = set point (1.00) $-$A$-$B$-$C). For convenience in signal modification and for keeping to a minimum the amount of control equipment utilized, it is preferred that the set point signal has a value of 1.00 relative to the weight fraction signals A, B, and C.

A divider 34 has a set point of 1.00 and is connected to the first adder for receiving the signal D, dividing the set point of the divider 34 by the signal D and delivering a computed signal E responsive to said division (E = 1.00/D). For the reasons set forth above with regard to the set point of the first adder, it is preferred that the set point of the divider 34 has a value of 1.00 relative to the weight fraction signals A, B, and C.

An analysis controller 36 has a biasing set point F and is connected to the analyzing means 30 for receiving the signal A (weight fraction of hydrogen in stream 24), subtracting said set point signal F from said measured signal A and delivering an output signal G responsive to said subtraction.

The biasing set point F is a manually set signal representative of the desired hydrogen weight fraction concentration.

A first multiplier controller 38 is connected to the divider 34 and the analysis controller 36 for receiving the signals E and G, multiplying said signal G by said signal E, and delivering an output signal H in response to said multiplication. Said signal H is the feed ratio of hydrogen modifier to total diluent.

A first flow rate measuring-transmitting element 40 is associated with the recycled diluent stream 14 for measuring the flow rate of said stream 14 and delivering a signal I responsive to said measurement.

The recycled diluent stream 14 is connected with the second feed stream 8 at a location X upstream of the reactor 2 and downstream of the means for controlling the flow rate of said second stream for commingling said recycle diluent stream 14 and the second feed stream 8 and forming a first composite stream 42. The first composite stream 42 and the modifier stream 10 are connected with the first feed stream 6 at locations upstream of the reactor 2 for forming a second composite stream 43 flowing into the reactor 2.

A second flow rate measuring-tramsmitting element 44 is associated with the second feed stream 8 and diluent stream 14 at a location between said location X and the reactor 2 for measuring the flow rate of the first composite stream 42 and delivering a signal J responsive to said measurement.

A switch 46 such as a manually operated switch for example, preferably a mechanical switch, is connected to the first and second flow rate measuring-transmitting elements 40, 44 for receiving the signals I and J therefrom and delivering a signal K. The signal K is a selected one of said signals I or J. This switch provides an operator the choice of controlling from the flow rates of the first composite stream 42 or the recycle diluent stream 14.

A third flow rate measuring-transmitting element 48 is associated with the diluent stream 12 at a location upstream of the location Y for measuring the flow rate of said diluent stream 12 and delivering a signal L in response to said measurement.

A second adder 50 is connected to the switch 46 and the third flow measuring-transmitting element 48 for receiving the signals K and L therefrom, adding signals K and L, and delivering a signal M in response to said addition.

A second multiplier controller 52 is connected to the output of second adder 50 and the output of the multiplier controller 38 for receiving and multiplying signals M and H, respectively, and delivering an output signal N in response to said multiplication.

A fourth flow rate measuring-transmitting element 54 is associated with the modifier stream 10 for measuring the flow rate of said stream and delivering a signal O in response to said measurement.

A control valve 56 is positioned in the modifier stream 10 for controlling the flow rate of said modifier stream 10 into the reactor 2. A flow rate controller 58 is connected to the output of the second multiplier controller 52 and the fourth flow measuring-transmitting element 54 for receiving signals N and O respectively, comparing said measured flow signal O with set point signal N and delivering a signal P to the control valve 56 for controlling the rate at which the modifier stream 10 is delivered into the reactor 2 (P = O − N).

In the process, a first feed stream 6 such as, for example, ethylene and a second feed stream 8, such as for example hexene-1, or butene-1 are controllably passed into the reactor 2. The recycle diluent stream 14 is delivered to the reactor and fresh diluent and catalyst are controllably added to the reactor 2.

Since the first and second feed streams are often varied in concentration, as known in the art, the analyzing means 30 is utilized for detecting these changes in the gas stream 24 that is separated from the resultant product of the reactor 2. The analyzer delivers signals responsive to this analysis. These signals are modified, thereafter compared with a modified signal that is responsive to one of the flow rates of the recycle diluent stream 14 or the flow rate of the first composite stream 42 for delivering a set point signal N that is utilized for controlling the flow rate of the modifier stream 10 into the reactor 2.

By so controlling the reaction, a more uniform product results from early detection of variations in concentration of the streams flowing into the reactor and controlling the modifier stream to minimize the upset in the reactor caused by the varying concentrations. The switch 46 permits the operator selectivity in modifying the signal M.

The following is an example of the controlled polymerization process and apparatus where butene-1, hydrogen and ethylene are incoming streams to the reactor.

EXAMPLE

| | |
|---|---|
| Stream 24 | = effluent of flash tank 22 |
| Signal A | = .0010 weight fraction of modifier hydrogen in stream 24 |
| Signal B | = .05 weight fraction of first feed stream 6, ethylene, in stream 24 |
| Signal C | = .02 weight fraction of second feed stream 8, butene-1, in stream 24 |
| Signal D | = 1.0-A-B-C = 0.929 |
| Signal E | = Set point of divider 34/D = 1.0/0.929 = 1.076 |
| Signal F | = Biasing set point of controller 36 = .9176 |
| Signal G | = A − F = .001 − (−.9176) = 0.9186 |
| Signal H | = (E)(G) = (1.076) (0.9186) = 0.988 SCFM of $H_2$/1.0 gal/min diluent |
| Signal J | = K = 20 gal/min first composite stream |
| Signal L | = 2 gal/min diluent (isobutane) |
| Signal M | = K + L = 20 + 2 = 22 gal/min diluent + second feed stream |
| Signal N | = (M) (H) = (22) (.988) = 21.744 SCFM $H_2$ set point value for Signal O |

Other modifications and alterations of this invention will become apparent to those skilled in the art from the foregoing discussion and accompanying drawing, and it should be understood that this invention is not to be unduly limited thereto.

We claim:

1. Apparatus comprising:
    a polymerization reactor;
    means for introducing a first feed material into said reactor;
    means for introducing a second feed material into said reactor;
    means for introducing a modifier into said reactor;
    means for introducing a diluent into said reactor;
    means for removing a product from said reactor;
    means for separating a gas from said product;
    means for establishing a signal D representative of the total concentration of material in addition to modifier, first feed material, and second feed material in said gas;
    means for establishing a signal G in response to a comparison of the concentration of modifier in said gas with a preselected desired modifier concentration in said gas;
    means for establishing in response to said signal G and said signal D a signal H representative of the desired ratio of modifier to diluent to be introduced into said reactor, said signal H being equivalent to the quotient of signal G divided by signal D;
    means for establishing a signal M responsive to the total flow rate of diluent into said reactor;
    means for multiplying said signal M and said signal H to establish a signal N;
    means for establishing a signal O representative of the flow rate of modifier into said reactor; and
    means for comparing said signal O with said signal N and controlling the flow rate of modifier into said reactor in response to said comparison.

2. Apparatus in accordance with claim 1 wherein said means for establishing said signal D comprises:

analyzing-transmitting means for analyzing said gas and delivering a signal A responsive to the concentration of modifier in said gas, a signal B representative of the concentration of first feed material in said gas, and a signal C representative of the concentration of second feed material in said gas; and means for adding said signals A, B, and C, and establishing a signal D in response to the subtraction of the total of said signals A, B, and C from a first set point signal.

3. Apparatus in accordance with claim 2 wherein said means for establishing a signal H comprises:

means for dividing a second set point signal by said signal D to produce a signal E; and means for multiplying said signal E and said signal G to produce said signal H.

4. Apparatus in accordance with claim 3 wherein said first set point and said second set point are each equal to 1.

5. Apparatus in accordance with claim 3 wherein said means for establishing said signal G comprises means for subtracting from said signal A a set point signal F representative of the desired hydrogen concentration in said gas and establishing said signal G in response to the subtraction.

6. Apparatus in accordance with claim 5 wherein said means for introducing a diluent into said reactor comprises:

means for introducing a first diluent stream into said reactor and means for introducing a recycled diluent stream into said reactor, and wherein said means for establishing signal M comprises:

a first flow rate measuring-transmitting element for measuring the flow rate of said recycled diluent stream and delivering a signal I representative thereof;

a second flow rate measuring-transmitting element for measuring the combined flow rate of said recycled diluent and said second feed into said reactor and delivering a signal J representative thereof;

switch means for receiving said signals I and J and delivering a signal K, said signal K being equal to said signal I or said signal J;

a third flow rate measuring-transmitting element associated with said first diluent stream for measuring the flow rate of said first diluent stream and delivering a signal L representative thereof; and means for adding said signal K and said signal L to establish said signal M.

7. Apparatus comprising:

a polymerization reactor;

means for introducing a first feed material into said reactor;

means for introducing a second feed material into said reactor;

means for introducing a modifier into said reactor;

means for introducing a diluent into said reactor;

means for removing a product from said reactor;

means for separating a gas from said product;

means for establishing a signal D representative of the total concentration of material in addition to modifier, first feed material, and second feed material in said gas;

means for dividing a first set point signal by said signal D to produce a signal E;

means for establishing a signal G in response to a comparison of the concentration of modifier in said gas with a preselected desired modifier concentration in said gas;

means for multiplying said signal G and said signal E to establish a signal H representative of the desired ratio of modifier to diluent to be introduced into said reactor;

means for establishing a signal M responsive to the total flow rate of diluent into said reactor;

means for multiplying said signal M and said signal H to establish a signal N;

means for establishing a signal O representative of the flow rate of modifier into said reactor; and, means for comparing said signal O with said signal N and controlling the flow rate of modifier into said reactor in response to said comparison.

8. Apparatus in accordance with claim 7 wherein said means for introducing a diluent into said reactor comprises:

means for introducing a first diluent stream into said reactor and means for introducing a recycled diluent stream into said reactor, and wherein said means for establishing signal M comprises:

a first flow rate measuring-transmitting element for measuring the flow rate of said recycled diluent stream and delivering a signal I representative thereof;

a second flow rate measuring-transmitting element for measuring the combined flow rate of said recycled diluent and said second feed into said reactor and delivering a signal J representative thereof;

switch means for receiving said signals I and J and delivering a signal K, said signal K being equal to said signal I or said signal J;

a third flow rate measuring-transmitting element associated with said first diluent stream for measuring the flow rate of said first diluent stream and delivering a signal L representative thereof; and means for adding signal K and said signal L to establish said signal M.

9. Apparatus in accordance with claim 8 wherein said means for establishing said signal D comprises:

analyzing-transmitting means for analyzing said gas and delivering a signal A responsive to the concentration of modifier in said gas, a signal B representative of the concentration of first feed material in said gas, and a signal C representative of the concentration of second feed material in said gas; and means for adding said signals A, B, and C, and establishing a signal D in response to the subtraction of the total of said signals A, B, and C from a second set point signal.

10. Apparatus in accordance with claim 9 wherein said means for establishing said signal G comprises means for subtracting from said signal A a set point signal F representative of the desired hydrogen concentration in said gas and establishing said signal G in response to the subtraction.

11. Apparatus in accordance with claim 10 wherein said means for separating a gas from said product comprises a flash tank means in fluid communication with said means for removing said product from said reactor, for delivering a bottom stream comprising said product and delivering an overhead stream comprising said gas.

12. Apparatus in accordance with claim 10 wherein said signal K delivered by said switch means is equal to said signal I.

13. Apparatus in accordance with claim 1 wherein said signal K delivered by said switch means is equal to said signal J.

* * * * *